United States Patent
Frommer et al.

[15] 3,660,239
[45] May 2, 1972

[54] FIBRINOLYSOKINASES FROM STREPTOMYCES

[72] Inventors: Werner Frommer; Otto Wagner, both of Wuppertal-Elberfeld, Germany

[73] Assignee: Farbenfabriken Bayer Aktiengesellschaft, Leverkusen, Germany

[22] Filed: Nov. 18, 1969

[21] Appl. No.: 877,818

[30] Foreign Application Priority Data

Nov. 22, 1968    Germany......................P 18 10 277.7

[52] U.S. Cl...........................................................195/66 B
[51] Int. Cl. ......................................................C12d 13/10
[58] Field of Search ........................................195/62, 65, 66

[56] References Cited

UNITED STATES PATENTS

| | | | |
|---|---|---|---|
| 3,140,984 | 7/1964 | Tosoni et al. | 195/66 B |
| 3,444,045 | 5/1969 | Derenzo et al. | 195/66 B |
| 3,477,913 | 11/1969 | Sloane | 195/66 B |

OTHER PUBLICATIONS

Chemical Abstracts Vol. 69, 1968 104046K

Primary Examiner—Lionel M. Shapiro
Attorney—McCarthy, Depaoli & O'Brien

[57] ABSTRACT

Fibrinolysokinase of good stability is isolated from culture solutions of actinomycetes by heat treatment at a low pH followed by fractional precipitation.

5 Claims, No Drawings

# FIBRINOLYSOKINASES FROM STREPTOMYCES

BACKGROUND OF THE INVENTION

1. Field of the Invention

This invention relates to the isolation of a fibrinolysokinase of good stability from culture solutions containing the same.

2. Description of the Prior Art

It is known that a fibrinolysokinase, urokinase, can be isolated from human urine. This process of isolation is however expensive because of the difficulty in recovery from the particular starting material used. Furthermore the content of kinases is so low that several 100 liters of urine have to be worked-up for one therapeutic dose [Astrup and Sterndorff, Nature, 170, 981 (1952)].

It is further known that a fibrinolysokinase, which is described as streptokinase, can be isolated from haemolytic streptococci. The disadvantages of this substance for medical use reside above all in its high antigenic action and in the requisite expensive purification operation, which increase the price very greatly [Markus and Ambrus, J. Biol. Chem. 235, 1673 (1960)].

Further, fibrinolysokinases are known from *Bacillus subtilis* [Shimi and Kelada, Arch. Mikrobiol. 50, No. 4, 326 (1965)] and from *Pasteurella pestis* [Beesley et al, J. Bacteriol. 94(1), 19 (1967)]. Here again a practical use is, for known reasons, not possible.

Therefore, to the present time, the art is not cognizant of procedures by which highly stable fibrinolysokinase can be isolated in a simple and efficient manner.

SUMMARY OF THE INVENTION

It is accordingly one object of the present invention to provide a procedure for the isolation of a fibrinolysokinase of extraordinary stability.

A further object is to provide a procedure for the isolation of highly stable fibrinolysokinase from culture solutions of actinomycetes.

Other objects of the present invention will become apparent as the description thereof proceeds.

In satisfaction of the foregoing objects and advantages, there is provided by this invention a process for the isolation of a fibrinolysokinase of extraordinary chemical stability in a simple manner from culture solutions of actinomycetes. This isolation is conducted by a heat treatment of the culture at a low pH, for example, about 1.5, followed by fractional precipitation. The molecular weight of this substance is relatively low so that no antigen actions are to be expected.

DESCRIPTION OF PREFERRED EMBODIMENTS

As pointed out above, the process of the invention is concerned with a process for the isolation of a fibrinolysokinase, urokinase, a known substance, from culture solutions of actinomycetes. The resulting product is of extraordinary chemical stability.

The process comprises culturing the culture solutions, as described hereinafter, and then separating off the proteases after 1 to 10 days, preferably about 2 to 3 days growth. Thereafter the resulting culture is adjusted to a pH on the acid side, about 0 to 4.0 but preferably about 1.5 with an acid substance such as very dilute acids (e.g. 5 percent to 15 percent aqueous solutions). Acids which may be employed include inorganic acids such as aqueous hydrochloric acid, phosphoric acid, etc., organic acids as well as non-toxic salts which will effect the acidification. A preferred acidification reagent is 10 percent aqueous hydrochloric acid.

After acidification, the resulting mixture is heated at a temperature of about 50° – 80°C., preferably 65°C., for about 5 minutes to 1 hour, depending on the temperature. For example, heating at about 65°C., requires about 15 minutes.

On conclusion of the heating step, the mixture is immediately cooled and the pH of the mixture then adjusted to a pH of about 5 to 10, preferably 7.5. Adjustment of the mixture to a neutral or basic pH may be accomplished by the addition of a base such as dilute (5 to 15 percent) NaOH, KOH, LiOH and mixtures thereof as well as alkali metal and alkaline earth metal carbonates, bicarbonates, etc., as well as any other known neutralization substance.

The resulting mixture is then subjected to concentration by centrifuging to remove the liquid or by evaporation of the liquid as by use of a vacuum. Thereafter, fractional precipitation is effected by adding the resulting supernatant liquid to an excess (e.g., a 2- to 6-fold volume) of an organic liquid. Acetone is preferably employed as the organic liquid but other organic liquids such as homologous ketones, ethers, and the like may also be used as this is a common expedient in the art. The mixture is then agitated for a short period at a low temperature, e.g., −40°C. to 0°C. and then allowed to stand at a temperature of about −10° to +10°C. for 1 to 5 hours. The supernatant liquid is then decanted.

The resulting sediment is then taken up again in cold organic solvent with thorough dispersion of the sediment. The mixture is then again centrifuged and the resulting sediment worked up one or more times with organic solvent and/or dried in vacuo. Yields of the product will range from about 50 to 80 percent with enrichment being as high as 10-fold.

Strains of actinomycetes which produce lysokinases can be easily found in accordance with the method given below. They occur in large numbers among the actinomycetes class.

Strains of the order Actinomycetales especially those of the family of the Streptomycetaceae, and among these, especially strains of the genus Streptomyces, because of their ease of culture, are isolated from samples of soil in a known manner. Culture flasks containing nutrient solutions which permit the growth of these strains are inoculated with samples of these strains obtained by inoculation. It is for example possible to use the glycerine-glycine nutrient solution according to von Plotho, of which the composition is 2 percent glycerine, 0.25 percent glycine, 0.1 percent NaCl, 0.1 percent $K_2HPO_4$, 0.01 percent $FeSO_4 \cdot 7H_2O$, 0.01 percent $MgSO_4 \cdot 7H_2O$ and 0.01 percent $CaCO_3$. To produce more rapid growth, it is appropriate to further add complex sources of carbon, such as for example corn steep liquor (preferably in concentrations of about 0.25 percent) or soya flour (preferably again in concentrations of 0.25 percent), or both, to such a nutrient solution. In such cases the pH-value of the solution must be adjusted. An initial pH of the nutrient solution of between 6.0 and 8.0, especially between 6.5 and 7.5, is preferred.

The glycerine of the nutrient solution can also be replaced by other sources of carbon such as for example glucose or sucrose. Instead of the glycine, other nitrogen sources such as for example alanine, ethylamine or lysine, can also be used. The concentrations of the carbon sources and nitrogen sources, and the concentration of the salts, may vary within wide limits. $FeSO_4$, $CaCO_3$ and $MgSO_4$ can also be entirely absent.

In one embodiment 100 ml. of the nutrient solution are filled into 1-liter Erlenmeyer flasks, sterilized in a known manner, inoculated with the strain to be investigated, and the flask incubated at 15° to 35°C., preferably at 23° to 30°C., on shaking machines. When the culture shows growth, which generally occurs after 1 to 10 days, in most cases after 3 to 5 days, a sample of, for example, 5 ml. is taken, the mycelium in this sample is removed by filtration or centrifugation, and the solution is adjusted to a pH of 0 to 4 with approximately 1/10 HCl. Thereafter the mixture is heated to 65°C. for 15 minutes, immediately cooled, and the pH-value adjusted to 5–10 with approximately 1/10 NaOH. The fibrinolysokinase activity is determined in the usual manner on the Müllertz-Astrup plate. Any residual proteolytic activity is determined in a known manner, again on the heated Müllertz-Astrup plate.

In this invention, there has been tested a whole series of strains of the most diverse genera of the order Actinomycetales in accordance with the method described above and found lysokinase activities which, even though in part weak, were nevertheless distinct, in various genera. The strains of the family of the Streptomycetaceae, especially those of the genus Streptomyces, were the most favorable as regards yield and ease of culture. Of 32 streptomycetes which were tested, the culture solutions showed degradation zones on the non-heated fibrin plates in the case of 16 streptomycetes even if the pH-value of the culture solution was adjusted at 1.5–1.8. Of these 16 strains, 6 showed no degradation zones on the heated plate, that is to say with denatured plasminogen, and thus do not contain any proteases after the preceding treatment. In these cases the action must thus be ascribed to a lysokinase.

These 6 strains (for a description of the strains see Table 1), which on the basis of their sporophore structure all belong to the strain Streptomyces, show the important systematic characteristics listed in Table 1 [Hutter, R., "Systematik der Streptomyceten" ("Systematisation of the Streptomycetes"), Bibliotheca Microbiologica, Fasc. 6, S. Karger, Basel, New York, 1967].

The strains St 16, St 18 and St 24 were deposited in the Centraalbureau voor Schimmelcultures under Numbers CBS 670.68, 671,68 and 669,68.

In order to obtain fibrinolysokinase, these strains are cultured as described above. After 2 to 3 days' growth the mycelium is separated off and the lysokinase enriched from the culture broth, by concentrating the solution and precipitation with organic solvents as described herein.

The following examples illustrate the process of the invention.

EXAMPLE 1

A 1 liter Erlenmeyer flask which contains 100 ml. of a nutrient solution of composition 2 percent glycerine, 0.05 percent glycine, 0.4 percent corn steep liquor, 0.4 percent soya flour, 0.1 percent NaCl, 0.1 percent $K_2HPO_4$, 0.01 percent $MgSO_4 \cdot 7H_2O$, 0.01 percent $FeSO_4 \cdot 7H_2O$ and 0.01 percent $CaCO_3$ (sterilization for 60 minutes at 121°C.) is inoculated with 1 ml. of a spore suspension which is obtained by rinsing a 10 day old inclined test tube of the strain St 16 together with glycerine-glycine agar, according to von Plotho, with 12 ml. of water. The culture is incubated on a shaking machine at 24°C. After 3 days' incubation a culture solution is obtained which contains 1.9 CTA units/ml. The almost clear centrifuged filtrate is adjusted to pH 1.5 and kept for 15 minutes at 65°C. It is immediately cooled, adjusted to pH 7.5 and again centrifuged. The sediment is discarded. The supernatant liquid is added to a 4-fold volume of acetone cooled to −20°C. and the mixture is stirred for 5 minutes. The mixture is then left to stand for 3 hours at +4°C. The supernatant liquid is finally decanted and discarded.

The sediment is again taken up in cold dry acetone and thoroughly dispersed therein. Thereafter the mixture is centrifuged and the resulting sediment is dried in vacuo. Yield is about 50 to 80 percent; enrichment, about 10-fold.

The strain St 16 shows the species characteristics listed in Tables 1, 2 and 3 and is probably to be classified with Streptomyces chrysomallus Lindenbein [Lindenbein, W., Arch. Mikrobiol. 17, 361 (1952)].

EXAMPLE 2

If a nutrient solution according to Example 1 is inoculated with 1 ml. of a spore suspension which is obtained by rinsing a 10 day old inclined test tube of strain St 24 with 12 ml. of water, and incubated according to Example 1, then a culture solution is obtained after 2 days' culture which contains 0.51 CTA units/ml.

The almost clear centrifuged filtrate is for example adjusted to pH 1.5 and kept for 15 minutes at 65°C. After cooling immediately, it is adjusted to pH 7.5 and again centrifuged. The sediment is discarded.

The supernatant liquid is added to a 4-fold volume of acetone cooled to −20° C. The mixture is stirred for 5 minutes and is then left standing for 3 hours at +4°C. The supernatant liquid is finally decanted and discarded.

The sediment is again taken up in cold dry acetone and thoroughly dispersed therein. Thereafter the mixture is centrifuged and the resulting sediment is dried in vacuo. Yield about 50 to 90 percent. Enrichment, about 10-fold.

The strain St 24 shows the species characteristics listed in Tables 1, 2 and 3 and is probably to be classified with Streptomyces griseus Waksman et Enricci [Waksman, S.A., "The Actinomycetes" Vol. II, The Williams and Wilkins Comp., Baltimore (1961)].

EXAMPLE 3

If 100 ml. of a nutrient solution containing 3 percent glycerine, 0.4 percent glycine, 0.25 percent corn steep liquor, 0.4 percent soya flour, 0.1 percent NaCl, 0.1 percent $K_2HPO_4$, 0.01 percent $MgSO_4 \cdot 7H_2O$, 0.01 percent $FeSO_4 \cdot 7H_2O$ and 0.01 percent $CaCO_3$ (sterilization for 60 minutes at 121°C.) are inoculated in accordance with Example 2 with the strain St 24, then a nutrient solution is obtained after 3 days' culture which contains 10.2 CTA units/ml.

The further working-up takes place as stated in Examples 1 and 2.

EXAMPLE 4

If 100 ml. of a nutrient solution according to Example 3 are inoculated with 1 ml. of a spore suspension obtained by rinsing a 10 day old inclined test tube of strain ST 18 together with glycerine-glycine-agar according to von Plotho, then a culture broth containing 5.3 CTA units/ml. is obtained after 4 days' culture on a shaking machine at 24°C.

The further working-up takes place as stated in Examples 1 and 2.

The strain St 18 shows the species characteristics quoted in Tables 1, 2 and 3 and is probably to be classified with Streptomyces chrysomallus Lindenbein [Lindenbein, W., Arch. Mikrobiol. 17, 361 (1952)].

EXAMPLE 5

If 100 ml. of a nutrient solution of composition 2 percent glucose, 0.4 percent glycine, 0.25 percent corn steep liquor, 0.25 percent soya flour, 0.1 percent NaCl, 0.1 percent $K_2HPO_4$, 0.01 percent $MgSO_4 \cdot 7H_2O$, 0.01 percent $FeSO_4 \cdot 7H_2O$ and 0.01 percent $CaCO_3$ (sterilization for 60 minutes at 121°C.) are inoculated with a spore suspension according to Example 4 of the strain St 18 and incubated for 4 days at 24°C., a culture solution containing 4.2 CTA units/ml. is obtained.

The further working-up takes place as stated in Examples 1 and 2.

EXAMPLE 6

If nutrient solutions which in addition to 2 percent glycerine, 0.4 percent glycine, 0.4 percent soya flour and 0.25 percent corn steep liquor contain the salt concentrations quoted in Table 4 are inoculated according to Example 4, the yields quoted in Table 4 are obtained.

The further working-up takes place as stated in Examples 1 and 2.

EXAMPLE 7

If nutrient solutions of composition 2 percent glycerine, 0.25 percent corn steep liquor, 0.25 percent soya flour, 0.1 percent NaCl, 0.1 percent $K_2HPO_4$, 0.01 percent $MgSO_4 \cdot 7H_2O$, 0.01 percent $FeSO_4 \cdot 7H_2O$ and 0.01 percent $CaCO_3$ (sterilization for 60 minutes at 121°C) are inoculated, with the addition of various aminoacids in concentrations of 0.4 percent according to Example 4, then the following yields are obtained after 4 days' culture at 24°C:

| Addition (0.4%) | CTA Units/ml. |
| --- | --- |
| Alanine | 6.2 |
| L-Tyrosine | 0.31 |

| | |
|---|---|
| L-Lysine | 0.39 |
| Glycine | 4.8 |

The further working-up takes place as stated in Examples 1 and 2.

EXAMPLE 8

If a fermenter containing 60 liters of a nutrient solution of 2 percent glycerine, 0.4 percent glycine, 0.25 percent corn steep liquor, 0.4 percent soya flour, 0.1 percent NaCl, 0.1 percent $K_2HPO_4$, 0.01 percent $MgSO_4 \cdot 7H_2O$, 0.01 percent $FeSO_4 \cdot 7H_2O$ and 0.01 percent $CaCO_3$ (sterilization for 60 minutes at 121°C.) is inoculated with 15 well-grown Erlenmeyer flasks containing 100 ml. of nutrient solution of the same composition, inoculated with strain St 18 and incubated at 24°C. with stirring and aeration, a culture solution containing the following CTA units/ml. is obtained:

| Duration of Culture (hours) | CTA Units/ml. |
|---|---|
| 36 | 1.9 |
| 44 | 3.2 |
| 52 | 3.8 |
| 60 | 7.0 |
| 68 | 7.8 |
| 76 | 8.4 |

The further working-up takes place as stated in Examples 1 and 2.

EXAMPLE 9

If 100 ml. of a nutrient solution according to Example 8 are inoculated with a spore suspension of the strain Streptomyces californicus ATCC 3312 and incubated for 90 hours on a shaking machine at 23°C., a culture solution containing 1.4 CTA units/ml. is obtained.

EXAMPLE 10

If 100 ml. of a nutrient solution according to Example 8 are inoculated with a spore suspension of the strain Streptomyces griseus ATCC 10 137 and incubated for 65 hours on a shaking machine at 23°C., a culture solution containing 5.2 CTA units/ml. is obtained.

TABLE 1.—DESCRIPTION OF THE STRAINS

| Strain | Streptomyces chrysomallus Lindenbein Type Strain 1 | St 4 | St 7 | St 16 | St 18 | St 21 | St 24 |
|---|---|---|---|---|---|---|---|
| Morphology of the air mycelium. | Sympodially branched bundles with straight or wavy sporophores, no spirals. | Strongly branched sporophores, ends strongly spiraled, mostly 8-10 turns. | | | Sympodially branched bundles with straight or wavy sporophores; no spirals. | | |
| Morphology of the spores. | Smooth. | Smooth. | Mostly smooth, in part with warts. | | Smooth. | Smooth. | Smooth. | Smooth. |
| Color of the air mycelium. | Only white in the young state or when poorly developed, cream with admixtures of green and grey when copiously developed. | Mouse grey in the ripe state. | Mouse-grey. | | Only white in the young state or when poorly developed, cream with admixtures of green and grey when copiously developed. | Cream in, part grey. | See St 1. |
| Chromogen formation (see Table 2, glucose, nutrient, tyrosine-agar, gelatine stab culture. | No brown pigment. | No brown pigment. | Forms brown pigment. | | No brown pigment. | | No brown pigment. |

TABLE 2.—BEHAVIOUR OF THE STRAINS ON THE MOST IMPORTANT DIAGNOSTIC NUTRIENTS

[G = Growth; AM = Air Mycelium; SP = Soluble Pigment]

| Nutrient | Streptomyces chrysomallus Lindenbein Type Strain | St 16 | St 18 | St 24 |
|---|---|---|---|---|
| Synthetic agar [1] | | | | |
| G. | Strong, crusty, yellow. | Strong, crusty, yellow. | Crusty, colourless. | Moderate, thin, crusty, colourless. |
| AM. | Dusty, thin, white. | Strongly floury, white to cream. | Dusty, later slightly floury, white to cream. | Absent. |
| SP. | Pale yellow. | Yellow. | Absent. | Do. |
| Glycerine-glycine agar:[2] 28°: | | | | |
| G. | Strong, crusty to wrinkly, yellow to yellow orange. | Strong, crusty, yellow orange. | Crusty, olive to brown olive. | Crusty, yellow to yellow brown. |
| AM. | Dusty indications, white. | Floury, white to cream. | Dusty, cream, locally grey. | Floury, white to cream. |
| SP. | Golden yellow. | Golden yellow. | Pale yellow. | Indications of yellowish brown. |
| 37°: | | | | |
| G. | 0. | 0. | 0. | Weakly crusty, colourless. |
| AM. | | | | Partly floury, white to cream. |
| SP. | | | | Absent. |
| 50°: G. | 0. | 0. | 0. | 0. |
| Glucos-asparagine-agar: [1] | | | | |
| G. | Good, crusty to pustular, colorless to pale yellowish. | Crusty, yellow. | Crusty, pale yellowish. | Crusty, pale yellow. |
| AM. | Dusty indications white. | Dusty, white. | Floury, whitish to cream. | Floury to dusty, white. |
| SP. | Pale yellow. | Yellow. | Pale yellow. | Pale yellowish. |
| Ca-malate Agar: [1] | | | | |
| G. | Moderate, finely crusty, colourless. | Moderate, crusty, pale yellow. | Moderate, crusty, colourless. | Weakly crusty, colourless. |
| AM. | Indicated, white. | Absent. | Absent. | Absent. |
| SP. | 0. | Greenish-yellow. | do. | Do. |
| Starch plate: [1] | | | | |
| AM. | Strong, crusty, yellow. | Crusty, yellowish. | Crusty, yellow. | Very thin, crusty, colourless. |
| G. | Dusty indications, white. | Dusty, locally floury, white to cream. | Dusty to floury, white to cream. | Indicated, whitish. |
| SP. | Absent, starch degradation: moderate. | Pale yellow starch degradation: moderate. | Absent, starch degradation: weak. | Absent, starch degradation: weak. |

TABLE 2.—BEHAVIOUR OF THE STRAINS ON THE MOST IMPORTANT DIAGNOSTIC NUTRIENTS—Cont.

[G = Growth; AM = Air Mycelium; SP = Soluble Pigment]

| Nutrient | Streptomyces chrysomallus Lindenbein Type Strain | St 16 | St 18 | St 24 |
|---|---|---|---|---|
| Cellulose broth:[1] | | | | |
| G | 0 | 0 | 0 | 0. |
| Glucose-agar:[1] | | | | |
| G | Strong, crusty to wrinkly, pale yellow. | Moderate, crusty, colourless | Moderately crusty, colourless | Weakly crusty, colourless. |
| AM | Locally dusty, white | Absent | Absent | Absent. |
| SP | Yellowish | do | do | Do. |
| Nutrient, agar:[1] | | | | |
| G | Good, crusty, yellowish. | Slimy, yellow | Crusty, yellowish | Crusty, colourless. |
| AM | 0 | Absent | Dusty, white to cream | White indications. |
| SP | Yellow | Yellow | Yellow | Absent. |
| Tyrosine-agar:[3] | | | | |
| G | Crusty | Crusty, colourless | Crusty, brownish | Weakly crusty, colourless. |
| AM | Indicated | Indicated | Dusty, white to cream | Locally greenish yellow. |
| SP | Weakly yellowish | Yellowish | Weakly brownish | Absent. |
| Potato-agar:[4] | | | | |
| G | Very strong, wrinkly, golden yellow to orange yellow later brownish. | Strong, crusty, wrinkly, orange to olive. | Strong, crusty to wrinkly, yellow green, later brownish. | Very strong, crusty, yellow brown. |
| AM | 0 | Partly present, thinly dusty, white. | Locally dusty, white to greenish yellow. | Strongly floury, greenish, cream or grey. |
| SP | Yellowish, later yellow brown. | Yellow olive | Greenish brown | Green yellow to yellow brown. |
| Oatflake-agar:[4] | | | | |
| G | Moderate to good, crusty, yellow. | Thinly crusty, yellow to yellow orange. | Crusty, colourless | Crusty, brownish. |
| AM | Absent | Partly dusty, white to cream | Floury, white to yellow green. | Locally floury, white to greenish. |
| SP | Yellow | Yellow | Absent | Pale yellow to light brown. |
| Litmus milk: | | | | |
| G | Ring, colourless | Ring, colourless | Ring | Ring. |
| AM | Absent | Absent | Absent | Absent. |
| SP | Slight precipitate; no peptonisation. | Precipitate, no peptonisation | Precipitate, no peptonisation | Precipitate, no peptonisation. |
| Löffler's serum nutrient: | | | | |
| G | Very strong, wrinkly, slimy, yellow brown. | Very strong, wrinkly, slimy, brown olive. | Very strong, wrinkly, slimy, brown olive. | Very strong, wrinkly, slimy, olive. |
| AM | Absent | Absent | Absent | Absent. |
| SP | Absent, slow liquefaction. | Absent, slow liquefaction | Absent, slow liquefaction | Pale yellow, slow liquefaction. |
| Carrot wedges: | | | | |
| G | Strong, crusty to wrinkly, yellow to reddish. | Few colonies, strong, wrinkly, olive. | Individual colonies, wrinkly, brown olive. | One colony, crusty to wrinkly, olive. |
| AM | Dusty indication, white. | Locally dusty, white | Partly dusty, yellowish | Absent. |
| SP | Absent | Absent | Absent | Do. |
| Potato wedges: | | | | |
| G | Very strong, wrinkly, golden yellow. | Very strong, wrinkly, orange to brick red. | Strong, wrinkly brown | Very strong, wrinkly. |
| AM | Absent | Fine as dust, white or yellowish. | Isolated areas, thin white | Floury, white. |
| SP | Absent | Absent | Absent | Absent. |
| Gelatine-stab culture:[1] | | | | |
| G | Strong, crusty, yellow brown. | Crusty, yellow | Crusty, yellow | Wrinkly, brownish. |
| AM | Absent | Dusty, white | Dusty, white | Floury to dusty, cream. |
| SP | Absent strong liquefaction. | Absent strong liquefaction | Absent, strong liquefaction | Absent, strong liquefaction. |
| Peptone-iron-agar (Difco): | | | | |
| G | Strong, crusty | Strong, crusty | Strong, crusty | Strong, crusty. |
| AM | 0 | 0 | 0 | 0. |
| SP | Brownish | Yellow brown | Yellowish brown | Yellowish brown. |

[1] According to Lindenbein, W. Glucose-agar: $K_2HPO_4$ instead of $KH_2PO_4$; Ca Malate-Agar: without glycerine.
[2] According to von Plotho, see Waksman, S.A.
[3] According to Hutter, R.
[4] According to Waksman, S.A. Potato-agar: Potato-glucose-agar with $CaCO_3$ and $MgSO_4$.

TABLE 3.—GROWTH ON VARIOUS CARBON AND NITROGEN SOURCES

[Nutrient according to Waksman S.A.: +++ = very strong growth; ++ = strong growth; + = moderate growth; ± = doubtful growth; 0 = no growth]

| Carbon source | Streptomyces chrysomallus Lindenbein Type Strain | St 16 | St 18 | St 24 |
|---|---|---|---|---|
| d-Xylose | ++ | ++ | +++ | +++ |
| l-Arabinose | +++ | +++ | +++ | 0 |
| Rhamnose | +++ | +++ | +++ | 0 |
| d-Galactose | +++ | +++ | +++ | ++ |
| Sucrose | 0 | ± | 0 | 0 |
| Maltose | +++ | +++ | +++ | ++ |
| Maltose/a | +++ | +++ | +++ | ++ [1] |
| Lactose | ++ | (2) | (2) | (2) |
| | +++ | +++ | +++ | +++ |
| Raffinose | 0 | 0 | 0 | 0 |
| Inulin | 0 | 0 | 0 | 0 |
| d-Mannitol | +++ | +++ | +++ | +++ |
| d-Sorbitol | ± | 0 | 0 | +++ |
| Dulcitol | ± | ± | ± | ± |
| Inositol | ± | ± | ± | 0 |
| Na acetate | ± | ++ | ± | ± |
| Na citrate | ± | ++ | + | + |
| Na succinate | ± | + | + | + |
| d-Glucose | +++ | +++ | +++ | +++ |
| d-Glucose/a | (3) | +++ | +++ | + [1] |
| Fructose | ++ | +++ | +++ | ++ |
| Base nutrient | 0 | 0 | 0 | 0 |

[1] $NaNO_3$ instead of $(NH_4)_2SO_4$.
[2] Individual colonies.
[3] 1 colony.

TABLE 4
[Concentration in the nutrient solution in percent]

| NaCl | $K_2HPO_4$ | $MgSO_4 \times 7 H_2O$ | $CaCO_3$ | $FeSO_4 \times 7 H_2O$ | CTA units/ml, after 4 days' culture |
|---|---|---|---|---|---|
| 0.2 | 0.1 | 0.01 | 0.01 | 0.01 | 2.5 |
| 0.1 | 0.2 | 0.01 | 0.01 | 0.01 | 2.3 |
| 0.1 | 0.1 | 0 | 0.01 | 0.01 | 2.55 |
| 0.1 | 0.1 | 0.02 | 0.01 | 0.01 | 2.7 |
| 0.1 | 0.1 | 0.01 | 0 | 0.01 | 1.6 |
| 0.1 | 0.1 | 0.01 | 0.02 | 0.01 | 3.7 |
| 0.1 | 0.1 | 0.01 | 0.01 | 0 | 2.8 |
| 0.1 | 0.1 | 0.01 | 0.01 | 0.02 | 1.95 |

The fibrinolysokinases recovered by the process of the invention are useful as medicines for the known indications. Literature exists as to the use and dosage [Fletcher et al, J. Lab. and Clin. Med. 65, page 713 (1965)]. In general, it may be stated that this article and others indicate that the product is useful as a thrombolytic agent for the treatment of thromboembolic vascular disease. Dosage rates range from 25,000 to one million CTA units per hour, based on the body size or weight of the patient. Methods for administration and other data are set forth in the article mentioned above.

The invention has been described herein with reference to certain preferred embodiments. However, the invention is not

What is claimed is:

1. A process for the manufacture of a fibrinolysokinase which comprises growing a culture of the genus Streptomyces, removing proteases by adjusting the pH of the mixture to a pH of about 0 to 4.0, heating the mixture at a temperature of about 50°–80°C., cooling, adjusting the pH to a pH of about 5 to 10, and recovering the product by fractional precipitation.

2. A process according to claim 1 wherein the pH is initially adjusted to 0 to 4.0 by the addition of a dilute aqueous solution of an inorganic acid, an organic acid, acid salt or mixture thereof.

3. A process according to claim 1 wherein the pH is adjusted to about 5 to 10 after the heating step by the addition of an aqueous solution of an alkali metal or alkaline earth metal hydroxide, oxide, carbonate, bicarbonate or mixture thereof.

4. A process according to claim 3 wherein the fractional precipitation recovery step is carried out after adjustment of the pH to 5 to 10 by dissolving the mixture in an organic solvent, cooling to a temperature of about −40° to 0°C., and recovering the product therefrom.

5. A process according to claim 1 wherein the pH of the culture solution is adjusted to a pH of about 1.5 by the addition of about 10 percent aqueous HCl, the mixture is then heated at a temperature of about 65°C. for a short period, then cooled, the pH adjusted to about 7.5 by the addition of about 10 percent aqueous NaOH, the mixture is dissolved in an excess of acetone, cooled and the product recovered therefrom.

* * * * *